United States Patent [19]

Kolosov et al.

[11] 4,196,511

[45] Apr. 8, 1980

[54] APPARATUS FOR ASSEMBLING BANKS OF BATTERY ELECTRODES

[76] Inventors: Ivan A. Kolosov, ulitsa Astrakhanskaya, 118, kv. 54; Jury E. Ivanyatov, ulitsa M. Zatonskaya, 21; Valery N. Kosholkin, Novo-Astrakhanskoe shosse, 43, kv. 47, all of Saratov, U.S.S.R.

[21] Appl. No.: 847,563

[22] Filed: Nov. 1, 1977

[51] Int. Cl.² .............................................. B23P 19/04
[52] U.S. Cl. ........................................ 29/730; 29/743; 29/744; 53/540; 414/32; 414/41; 414/70; 414/71
[58] Field of Search ................. 29/730, 623.1, 743, 29/785, 809, 428, 744, 731, 738; 53/540; 214/1 BH, 6 FS, 8.5 D, 6 M; 271/9, 5

[56] References Cited

U.S. PATENT DOCUMENTS

| | | | |
|---|---|---|---|
| 2,294,273 | 8/1942 | Buxbaum | 214/8.5 D |
| 2,652,161 | 9/1953 | Herzig et al. | 214/8.5 D |
| 2,704,593 | 3/1955 | Galloway | 29/730 |
| 2,833,434 | 5/1958 | Stover et al. | 214/1 BH |
| 3,198,348 | 8/1965 | Cummings | 214/1 BH |
| 3,294,258 | 12/1966 | Sabatino et al. | 214/6 M |
| 3,406,837 | 10/1968 | Kirsch et al. | 214/1 BH |
| 3,551,993 | 1/1971 | Cassai et al. | 29/785 |

*Primary Examiner*—Daniel C. Crane
*Attorney, Agent, or Firm*—Lackenbach, Lilling & Siegel

[57] ABSTRACT

The device or apparatus for assembling banks of battery electrodes comprises a bed which mounts feeders with electrode-containing holders, and the feeders incorporating a mechanism for maintaining automatically the upper level of the electrode pile in the holders. Disposed above the feeders is an assembling mechanism comprising a shaft, one end of which is connected to a drive ensuring its vertical reciprocating motion in alternation with a full revolution around its axis, whereas the other end of the shaft carries radially-mounted grips made with a provision for being disengaged at a certain working stroke of the assembling mechanism by a readjustable kinematic linkage which can disengage part of the grips during the preset working stroke of the assembling mechanism. Also, mounted on the bed between the feeders is a fixed stop ensuring consecutive removal of the grips and a mechanism for unloading the assembled banks, with the mechanism being installed near the feeders and operating after a preset number of working cycles.

10 Claims, 5 Drawing Figures

APPARATUS FOR ASSEMBLING BANKS OF BATTERY ELECTRODES

BACKGROUND OF THE INVENTION

The present invention relates to the manufacture of storage batteries and more particularly, to a device for assembling banks of battery electrodes.

The device can be utilized for making any types of batteries, since they ensure automatic assembly of a preset number of electrodes of opposite polarity with separators into a pack of a desired thickness. The device can be utilized both separately and as part of an automatic battery assembly line.

The device according to the present invention will be used to the best advantage in the manufacture of nickel-cadmium batteries of a high power capacity made up of extra-thin low-stiffness electrodes, used in aviation, battery-powered trucks, etc.

The problem of automating the assembly of electrode banks of powerful batteries consists in that the bank of electrodes should be inserted into the container with a certain preset tightness of fit. The existing methods of electrode manufacture fail to guarantee the requisite accuracy of electrode thickness which is required for obtaining the necessary thickness of the assembled bank.

In many cases, more stringent demands on the tolerances for electrode thickness are either impossible from the technical point of view, or economically impracticable.

Therefore, the electrode banks of such batteries are assembled mostly by hand; in this process the electrodes of the required thickness are selected at the end of the assembly operation so as to ensure the required thickness of the bank containing a preset number of electrodes.

Known in the prior art is a method of mechanized assembly of electrode banks consisting in that a lever-and-cam manipulator with a grip reciprocates above a conveyor and feeders, picks up alternately the negative and positive electrodes from the feeders and places them one on top of another into a pile on the conveyor which moves periodically step-by-step between the adjacent feeders.

In this method, a plurality of feeders and manipulators are installed near one conveyor (the number of said feeders and manipulators corresponding to the number of electrodes and separators in a battery).

This method cannot ensure high efficiency since the manipulator reciprocates with an idle stroke each time when placing an electrode into a pile. In case of selective assembly of a large number of thin electrodes into banks (30 to 70 electrodes per bank), the assembly device will be bulky and difficult to operate. The method of assembling the banks in this device with a group of feeders installed on both sides of the conveyor and a twinned manipulator operating without idle strokes cannot be utilized for selective assembly, since in this case it is impossible to install electrodes of different thickness groups so as to ensure the required thickness of the bank.

Also known in the prior art is a method of mechanized assembly by loading electrodes of opposite polarity and separators into the feeders arranged above a conveyor with carriages, releasing one electrode from underneath each feeder, assembling a pile of electrodes and separators during the step-by-step movement of the conveyor carriages and assembling a bank of electrodes from several piles removed from the carriage by a pack-gathering mechanism after which the bank is withdrawn from the zone of assembly.

This method likewise fails to produce a bank of a predetermined thickness when the thickness of individual electrodes varies within wide limits. Besides, this method is not suitable for assembling banks from thin electrodes since the feeders release the electrodes from the bottom of the pile and cannot work reliably unless the electrodes are sufficiently thick and strong.

The prior art device for assembling a bank of battery electrodes according to the method described above comprises a plurality of feeders (carrying devices) for individual piles of electrodes and separators, located near the assembly zones and made in the form of a conveying device moving intermittently along the row of feeders. Installed along-side of the row of of grips (suction cups) for picking the upper plates and separators and transferring them to the assembly zones is a lever-and-cam manipulator which is linked with a common driving camshaft.

The device can also be made with the feeders arranged in a circle on a table which moves intermittently between the feeders in which case the grips actuated by the lever-and-cam manipulator will pick up alternately the plates or separators from each feeder and place them in a pile on the conveyor. In this case, the conveyor will make each step after the complete assembly of the electrode bank due to a kinematic linkage between the conveyor drive and the number of working cycles of the manipulator.

There is also another version of the device with the feeders arranged on both sides of the conveyor and with a pair of grips located above the feeders at such a distance from each other that within a working cycle they pick the plates alternately from the opposite (relative to the conveyor) feeders and simultaneously place the preceding plate into a pile on the conveyor. In this case, the manipulator places two plates within a working stroke, i.e. it works without idle motions. Here the feeders are installed in pairs opposite each other on both sides of the conveyor and each pair of feeders executes shuttle motions relative to the line of movement of the manipulator with two grips arranged perpendicularly to the location of the conveyor which allows the number of manipulators to be reduced by 50% but having the same output.

In these cases, there is also a time dependence of the intermittent advancement of the conveyor on the number of working strokes of the manipulator required for gathering the necessary number of plates and separators into a bank.

The above-described device for assembling banks of battery electrodes has serious disadvantages which prevent it from being employed for the selective assembly of banks containing a large number of electrodes (30 to 70) and having a predetermined thickness.

For example, if the device is intended to perform the selective assembly of a bank of twenty nine electrodes, it has to comprise at least twenty nine feeders and manipulators. Such a large, complicated and cumbersome device will fail to yield sufficient output due to a large number of idle strokes executed by the cam-and-lever mechanisms during assembly. The versions of the device covered by the patent and described above in which the idle strokes of the manipulators are eliminated, cannot be used for selective assembly at all because in these cases there is no possibility whatsoever of installing groups of electrodes of different thickness, sorted out in advance.

Besides, refitting of the above-cited device for assembling the banks of different type-sizes is difficult since the operation of the feeders and assembly manipulators has a definite relation to a certain type-size of the bank of electrodes so that refitting will involve labor-consuming replacement of the working elements followed by the adjustment of the entire mechanism.

SUMMARY OF THE INVENTION

An object of the present invention resides in providing a device for assembling the banks of battery electrodes which provides for the automation of selective assembly of electrode banks of a preset thickness.

Another object of the invention is to improve the efficiency of assembly of the bank of battery electrodes.

And still another object of the invention resides in providing a device for assembling banks of battery electrodes which would be easily refitted for assembling banks of battery electrodes of different type-sizes.

These and other objects and advantages are accomplished by an assembly device for the assembly by sorting of electrodes into groups of different thickness gathered into piles, packing the electrodes into a separating material, joining the electrodes of opposite polarity in a certain sequence and releasing the assembled banks. Before joining of the electrodes they are sorted out into an odd number of groups of different thickness (thin, medium, thick) so that the thickness of two medium electrode is equal to the sum of thicknesses of one thin and one thick electrodes which are equidistant from the medium one. The piles of medium-thickness electrodes are installed in an alternating order of polarities, in any number, and the piles of equidistant thin and thick electrodes only in pairs, and the electrodes are taken simultaneously, one from each pile and moved horizontally, thus being connected into a bank of a preset thickness.

More particularly, the device for assembling banks of battery electrodes comprises a bed which mounts the feeders accommodating replaceable holders with electrodes, and said feeders incorporating a mechanism for maintaining automatically the upper level of the electrode pile in the holders. An assembling mechanism with grips is arranged above said feeders and moved by a drive located on the bed, and there is also a mechanism for unloading the assembled banks, said mechanism being installed near the feeders, controlled by the drive of the assembling mechanism and operating after a preset number of working cycles. The assembling mechanism comprises a shaft one end of which is connected to the drive which reciprocates it vertically relative to the bed in alternation with a full revolution around its axis while the other end of the shaft carries radial grips which can be disengaged at a certain working stroke of the assembling mechanism by a readjustable kinematic linkage which disengages some of the grips during a certain working stroke of the assembling mechanism, the bed being provided with a fixed stop in the form of a fork ensuring consecutive removal of the electrodes from the grips of the assembling mechanism.

The method of assembling banks of battery electrodes and the assembling device ensure mechanization of the selective assembly of electrode banks of a present thickness to be used in batteries with the bank tightly inserted into the container. Efficiency of the process is improved because within one working stroke of the assembling mechanism several electrodes are assembled (as many as there are feeders) and there are no idle motions of the elements of the assembling mechanism. Refitting of the device is simplified when it is shifted over to selective assembly of the electrode banks for the batteries of other type-sizes because the grips are capable of being disengaged and are connected with the working stroke of the assembling mechanism by a readjustable kinematic linkage. The layout of the feeders and the possibility of loading them with electrodes of different thickness in replaceable holders as well as the readjustable relation between the mechanism for unloading the assembled banks and the number of the working cycles of the assembling mechanism allow the device to be used with a wide range of battery type-sizes. The device is refitted from one type to another by the use of appropriate holders and by the simple replacement of several grips and replaceable parts. Thus the device can be employed both in large-scale and small-scale production projects.

BRIEF DESCRIPTION OF THE DRAWINGS

The invention will be described in detail by way of examples with reference to the accompanying drawings in which.

DESCRIPTION OF THE PREFERRED EMBODIMENTS

Figure 1:
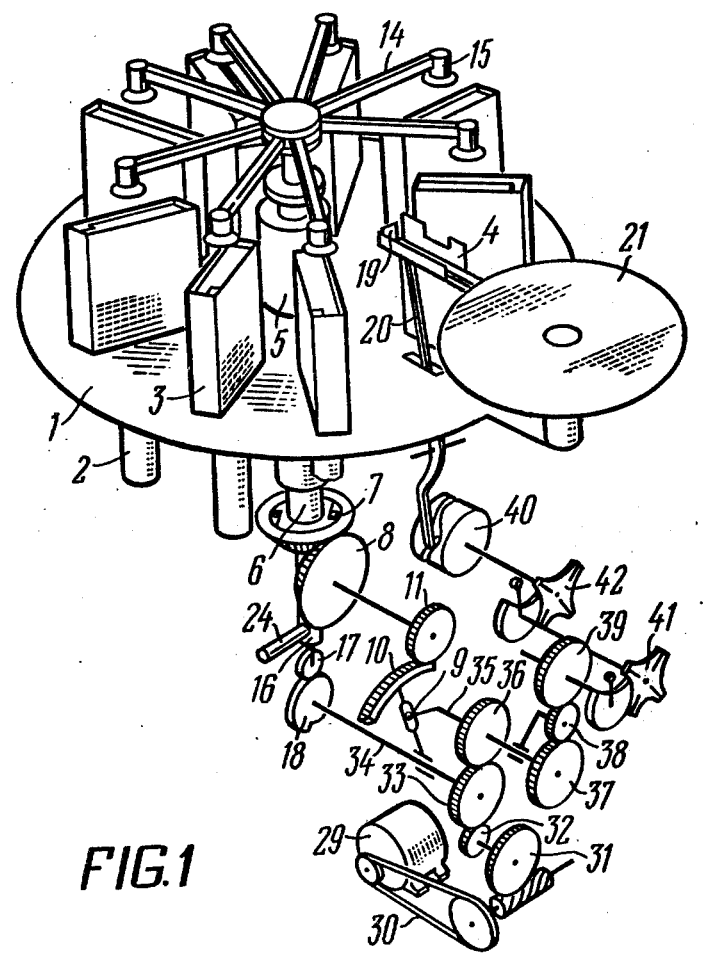
FIG. 1 is a perspective view illustrating the kinematic diagram of the device for assembling banks of battery electrodes.

Assembling the banks of battery electrodes according to the present invention consists in that the electrodes before assembly are sorted into an odd number of groups, of different thickness packed into a separating material and laid out in piles containing electrode groups of different thickness and polarity. The piles of electrodes are arranged successively in line, in the alternating order of polarities, the piles of medium thickness being laid in any number whereas the piles of thin and thick electrodes which are equidistant from the medium-thickness electrodes, only in pairs. Then the electrodes are taken, simultaneously one, from each pile and moved in a horizontal plane, thus being connected consecutively into a bank. The preset thickness of the bank is ensured because the thickness limits of electrodes in each group are selected in the course of sorting so that the thickness of two medium electrodes would always be equal to the thickness of two electrodes in the equidistant groups of thin and thick electrodes (within the tolerance ensuring the required tightness of fit).

The method of assembling the banks of battery electrodes permits mechanizing the selective assembly of electrode banks with a preset thickness of the bank due to the fact that the electrodes are sorted out into an odd number of groups and the banks are assembled from the electrode groups of different thicknesses. Thus, the method ensures guaranteed thickness of the assembled bank (within tolerance limits) containing a preset number of electrodes because the assembly of a pair of thin and thick electrodes is equal to the assembly of two medium electrodes.

Connection of the electrodes in a certain sequence by the simultaneous movement of a plurality of electrodes through the assembly position (e.g. a fork-like fixed stop) raises considerably the efficiency of the assembling device since the bank can be assembled in one or several working strokes of said device.

The method provides for picking up the electrodes from the top of the pile, and can, therefore, be used for assembling the banks from electrodes of any thickness, including thin and low-strength ones.

The method ensures complete mechanization of the assembly of the bank of battery electrodes and can be realized on the device described hereinbelow.

The device for assembling a bank of battery electrodes according to the present invention comprises a bed 1 (FIG. 1) in the form of a round table divided into nine positions and mounting eight feeders 2 incorporating a mechanism for the automatic maintenance of the upper level of the pile of electrodes (not shown in the drawings) in replaceable holders 3. The replaceable holders 3 are installed on the ends of the feeders 2 and stand out above the surface of the table. The table of the bed 1 is also provided with a fork-shaped fixed stop 4 located between the feeders 2 on the ninth position.

Figure 2:
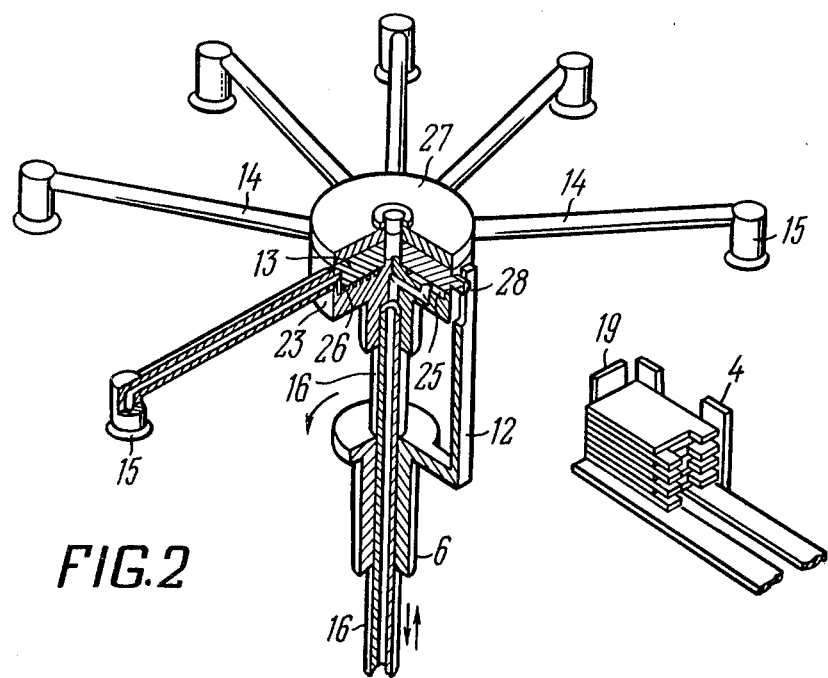
FIG. 2 is another perspective view showing the assembling mechanism of the device.

Installed in a hub 5 in the center of the bed 1 is a hollow shaft 6 (FIGS. 1, 2) which is connected with the drive by an overrunning clutch 7 (FIG. 1) slipped on the lower end of the shaft 6, and by a pair of bevel gears 8. The hollow shaft 6 which periodically rotates a full revolution being actuated by a link motion 9 which is connected with the pair of the bevel gears 8 by a segment gear or toothed quadrant 10 and a gear wheel 11. The upper end of the hollow shaft 6 is provided with a fork 12 (as best shown in FIG. 2) which transmits rotary motion to a disc 13 carrying eight radially secured holders 14 with gripping means or vacuum grips 15 (FIGS. 1, 2, 3) arranged around the circumference above the holders 3 (at the moment when the electrodes are being picked up from the holders). The disc 13 (FIG. 2) is connected with a central rod 16 passing through the hollow shaft 6.

Installed on the lower end of the rod 16 (FIG. 1) is a roller 17 interacting with a cam 18 which reciprocates the rod 16 vertically, jointly with the disc 13 (FIG. 2) and the grips 15 at the moment of gripping and lifting of the electrodes. The reciprocating motion alternates with the turning of the shaft 6 jointly with the disc 13 and the grips 15 around its axis during assembly of the bank. Thus, the shaft 6, the rod 16 with the disc 13 carrying the grips 15 and the fixed stop 4 constitute the assembling mechanism of the device which lowers and lifts the grips 15 for picking up electrodes from the replaceable holders 3 (FIG. 1). The lowering and lifting motion is executed in alternation with a full revolution of the shaft 6 around its axis during which the grips 15 pass through the fork of the fixed stop 4, and place the electrodes into banks near said stop.

At the side of the inner face of the fixed stop 4 there is a pusher 19 connected with the drive by a swinging lever 20.

Mounted at the external side of the stop 4 before the pusher 19, near the bed 1, is a rotatable disc magazine 21 which turns step by step during each swinging motion of the lever 20.

The pusher 19 with its drive and the rotatable disc magazine 21 constitute the mechanism for unloading the assembled banks of electrodes.

The disc 13 (FIG. 2) serves simultaneously as a movable slide valve of the vacuum distributor and is provided on the lower surface with holes 22 (FIG. 3) which communicate through the spaces of the holders 14 with the working chamber of the vacuum grips 15.

The body 23 (FIG. 2) of the vacuum distributor is mounted rigidly on the central rod 16 and moves vertically, jointly with the latter. The rod 16 is made in the form of a tube whose lower end is connected with a vacuum pump through a pipe union 24 (FIG. 1), while its upper end is connected with a groove 25 (FIGS. 2, 3) made on the face of the body 23 which also has concentric grooves 26 serving to connect separately each hole 22 of the disc 13 (FIG. 3) with the groove 25 when the electrodes are being picked from the holders 3.

The disc 13 (FIG. 2) is movably installed on the central spindle of the body 23 and rotates between said body 23 and the pressure plate 27 and is actuated by a pin 28 connected with the fork 12 of the hollow shaft 6. The drive consists of an electric motor 29 (FIG. 1) coupled by a V-belt transmission 30 with a worm reduction unit 31 which, in turn, is connected by a pair of spur gears 32, 33 with a distributing shaft 34.

The cam 18 which imparts vertical motion to the rod 16, is slipped directly on the distributing shaft 34 while the link motion 9 is connected to said shaft via an intermediate shaft 35 by a pair of spur gears 33, 36 at a speed ratio of 1:1.

The intermediate shaft 35 rotates at the same speed as the distributing shaft 34 and carries two gear wheels 36, 37, with the latter gear wheel connected via an intermediate gear 38 with a replaceable gear wheel 39, and with the gear wheel 39 transmitting motion to the lever 20 via a cam 40 and a pair of successively connected Maltese crosses 41, 42. The replaceable gear wheel 39 ensures a readjustable linkage between the mechanism for unloading the assembled banks and the distributing shaft 34 which determines the stroke of the assembly mechanism.

Figure 4:
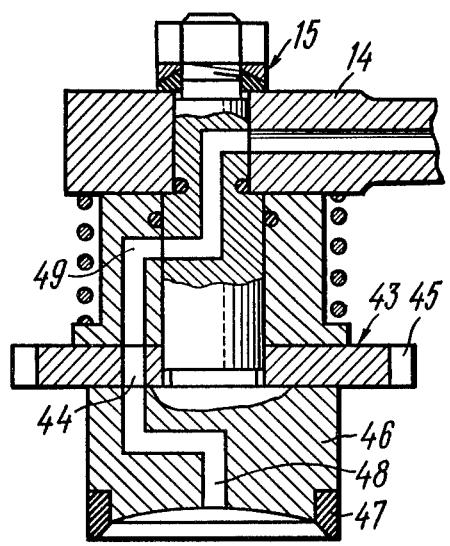
FIG. 4 is a sectional view of a grip.

The grip 15 (FIG. 4) comprises a movable slide valve 43 (FIGS. 4, 5) which has a row of through holes 44 arranged circumferentially on the face surface and teeth 45 on the cylindrical surface thereof.

Figure 5:
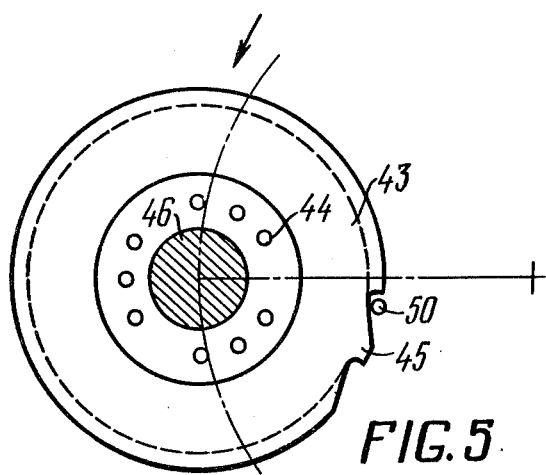
FIG. 5 shows the kinematic linkage of the grip with the working cycle of the assembling mechanism.

The body 46 of the grip 15 (FIG. 4) has a sealing ring 47 which forms a vacuum chamber connected to the vacuum system by means of a channel 48 through one of the through holes 44 in the movable slide valve 43 and by a shaped channel 49 with the space of the holder 14, and, by the channels in the body 23, as shown in FIG. 2. On the path of the moving grips 15 (FIGS. 2, 3) during the working stroke of the assembling mechanism there is a fixed stop 50 (FIG. 5) interacting with the teeth 45 of the slide valve 43 in such a manner that during each revolution of the assembling mechanism, the movable slide valve 43 of each grip makes one step between the teeth 45. The number of the through holes 44 and their arrangement around the circumference on the movable slide valve 43 determines the adjustable kinematic linkage which ensures disengagement of some of the grips 15 during a certain working stroke of the assembling mechanism. For example, the movable slide valve 43 illustrated in FIG. 5 will disengage the grip 15 at each fourth revolution of the assembling mechanism. By installing replaceable slide valves 43 with different layouts of the holes 44 or by installing the grips 15 with different slide valves, the device can be refitted for assembling the banks of electrodes with the number of electrodes not divisible by eight. For example, if three grips 15 (FIG. 3) with the slide valve 43 illustrated in FIG. 5 are installed in any position and the bank is assembled in four working cycles of the assembling mechanism, then the bank containing twenty four electrodes and assembled during the first three cycles will be increased during the fourth stroke only by five electrodes. As a result, the assembled bank will count twenty nine electrodes.

The kinematic linkage of the unloading mechanism comprising the lever 20 (FIG. 1), cam 40, and Maltese crosses 41, 42 is adjusted by replacing the gear wheel 39 with a wheel having a different number of teeth and unloading the assembled bank by the pusher 19 after a preset number of the working strokes of the assembling mechanism.

It should be borne in mind that the assembling mechanism can be actuated by a drive of a different design, based on, say, pneumatic, hydraulic, etc., systems provided it ensures vertical reciprocating movement relative to the bed 1 of the assembling mechanism shaft with the radially mounted grips, and said movement alternating with a full revolution of said shaft around its axis. The drive of the mechanism for unloading the assembled banks can also be realized in different versions. However, its linkage with the assembling mechanism should be readjustable, for permitting the bank to be assembled from any preset number of electrodes.

The grips 15 can be other than vacuumatic; for example, they may be magnetic and their kinematic linkage with the movement of the assembling mechanism can be made by overlapping a number of holders 3 during a preset stroke of the assembling mechanism. The main factor is the provision of a readjustable connection between them, permitting the bank to be assembled from electrodes whose number is not divisible by eight. The provision of eight feeders and grips in the device is not obligatory either. This number has been selected so as to ensure the easiest refitting of the device for the assembly of the banks containing more than twenty electrodes. Thus, the device may have seven feeders and grips which is more practicable when the number of electrodes in the banks is under twenty.

The disc magazine 21 for the assembled banks can be made in the form of, say, an ordinary or step-by-step conveyor, a receiving unit of an assembling machine, etc.

The device according to the present invention operates as follows:

Before assembly, the first step is to install replaceable holders 3 (FIGS. 1, 3) with electrodes already sorted into, say, three thickness groups. The holders 3 with medium electrodes may be installed in any number whereas the electrodes of the end groups, in pairs only.

Figure 3:
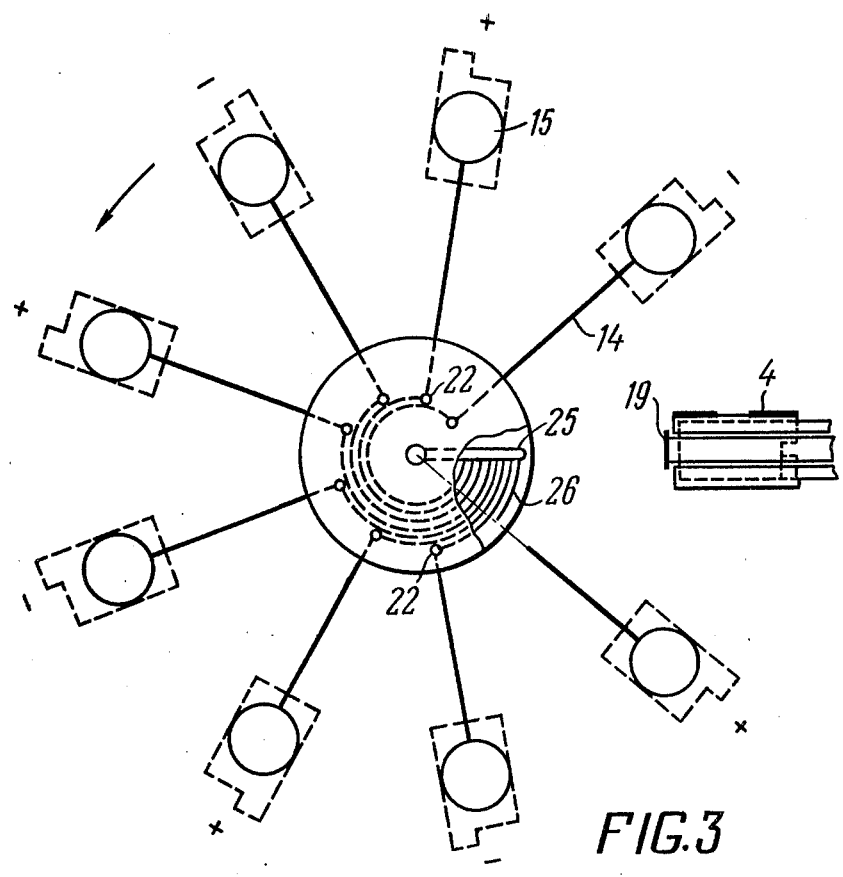
FIG. 3 is a plan view illustrating the arrangement of grips and feeders.

The holders 3 are installed in the alternating order of their polarities as shown in FIG. 3. After turning on the drive, the cam 18 (FIG. 1) lowers the rod 16 with the grips 15 until said grips 15 pick the upper electrode in the holder 3. Then the cam 18 lifts the rod 16 to the uppermost position. The link motion 9 acting via the segment gear or toothed quadrant 10 and the gear wheel 11, turns the shaft 6 one revolution. The grips 15 (FIG. 3) when passing through an opening or cutout in the fork or the fixed stop 4 leave the electrodes near said stop because on passing the groove 25 they are disconnected from the vacuum system and therefore release said electrodes.

During the reverse stroke of the link motion 9 (FIG. 1), the shaft 6 does not move due to the free motion of the overrunning clutch 7 while the cam 18 lowers and lifts the rod 16 for picking the next group of set of electrodes. This completes the first working stroke of the assembling mechanism after which the second stroke begins; eight electrodes are placed into the bank during each stroke.

If the speed ratio of the replaceable gear wheel 39 to the gear wheel 37 is 1:1, then the Maltese cross 41 will turn $\frac{1}{4}$ a revolution within each full revolution of the shafts 35 and 34.

During the fourth stroke the Maltese cross 41 executes the last quarter of a revolution whereas the Maltese cross 42 turns the cam 40 through $\frac{1}{4}$ of a revolution. The working slot in the cam 40 is shaped so as to ensure four complete swinging motions of the lever 20 within a complete revolution of the cam 40. Thus, by changing the speed ratio between the replaceable gear wheel 39 and the gear wheel 37 it is possible to obtain any desired number of strokes of the assembling mechanism in each bank assembly cycle which is completed when the pusher 19 unloads the assembled bank into the magazine 21. Then, the assembled packs of banks are inspected and forwarded for further battery-assembling operations.

The device for assembling banks of battery electrodes permits mechanization of assembly of, say, nickel-cadmium storage batteries with a high power capacity. Such batteries comprising thin low-strength electrodes gathered into a bank with a preset thickness for tight fitting of said bank into a battery container. The battery assembling mechanism consists of a shaft 6 carrying radially-mounted grips 15, and a fixed stop 4 in the form of a fork, and the device assembles the bank by the simultaneous picking of the electrodes from the feeders 2 and holders 3 and the joining of them into a bank when the grips 15 pass freely through the fork 12 of the fixed stop 4. In this process, the electrodes are not subjected to any distorting stresses so that the bank can be assembled from any electrodes, regardless of their thickness and strength.

The provision of an easily readjustable kinematic linkage for disengaging part of the grips 15 to suit the number of working strokes of the assembling mechanism alongside with simple refitting of the unloading mechanism (replaceable gear wheel 39) for ensuring the preset number of working strokes in the cycle of the bank assembly enables the bank to be assembled from any desired number of electrodes and the device of the present invention can be successfully used both in large- and small-scale production.

The device is designed with a provision for the simultaneous installation of several feeders 2 (e.g. seven, eight, etc.) and the device can be loaded with holders 3 containing groups of electrodes of different thickness which ensures mechanization of the selective assembly of the banks of electrodes.

The simultaneous assembly of several electrodes into a bank during one working cycle at a high speed of movement of the grips 15 ensures a high output of the device and is limited only by the centrifugal force tearing the electrodes from the grips.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

We claim:

1. An apparatus for selectively assembling units of electrodes pre-assorted according to thickness and polarity, comprising: a fixed bed having a table supporting a plurality of radially disposed holders, each holder housing a plurality of similar electrodes therein, and being provided with a mechanism for automatically keeping the upper level of electrode piles in said holders unchanged, an assembly mechanism having a shaft installed on said table and being adapted to be driven by a drive on said bed and having a plurality of gripping means spaced apart around and extending radially from said shaft, each said grip arranged above a holder, said assembly mechanism being operable to stack said electrodes into assembled units, and a mechanism for discharging assembled units of electrodes connected to said drive of said assembly mechanism; said shaft arranged vertically in the center of said table, the lower end of said shaft linked with a drive adapted to move said shaft upwardly and downwardly alternating with a complete revolution of the shaft, constituting a working cycle of said assembly mechanism, while the upper end of the shaft carrying said plurality of gripping means with a pitch in the circumferential direction corresponding to the spacing between a corresponding pair of said holders, said gripping means being adapted to follow the rotational movement of said shaft during the working cycle of the assembly mechanism, and a fixed stop formed as a fork extending into the path of movement of the electrodes during the rotation of said shaft; said mechanism for discharging the assembled units of electrodes being adapted to operate after the completion of a predetermined number of working cycles of said assembly mechanism, and at least some of said gripping means being selectively put out of operation at a predetermined working cycle of said assembly mechanism, so that the discharge of the assembled electrode unit is carried out after the completion of a predetermined number of working cycles, thereby permitting the assembly and the unloading of electrode units having a predetermined number of electrodes.

2. The apparatus according to claim 1, wherein said mechanism for discharging assembled units of electrodes including a pusher connected to the drive of said assembly mechanism by a cam actuated swinging lever and indexing means.

3. The apparatus according to claim 1, wherein said electrodes in said plurality of holders are simultaneously gripped by said plurality of gripping means.

4. The apparatus according to claim 1, wherein said shaft is hollow and said plurality of gripping means are lifted by means of a cam operated follower rod disposed within said shaft and axially movable with respect thereto.

5. The apparatus according to claim 4, wherein the upper end of said hollow shaft is provided with a fork element which transmits intermittent rotary motion to said disc supporting said plurality of gripping means.

6. The apparatus according to claim 5, including a pin, radially extending from said disc, actuated by said fork element of said hollow shaft for the intermittent actuation of said disc during the operation of said apparatus.

7. The apparatus according to claim 6, wherein said electrodes are sequentially deposited in a stacked bank as each said gripping means passes freely through an opening in a fixed stop element, and said gripping means of said disc releases said electrode onto the stacked bank at a predetermined time triggered by the relative movement of said gripping means with respect to said table, at the point when said gripping means pass over said bank.

8. The apparatus according to claim 2, including a rotatable disc magazine turning in step during each swinging motion of said cam actuated lever for receiving assembled units of electrodes.

9. The apparatus according to claim 7, wherein said gripping means are of the vacuum type.

10. The apparatus according to claim 7, wherein said gripping means are of the magnetic type.

* * * * *